United States Patent Office 3,431,723
Patented Mar. 11, 1969

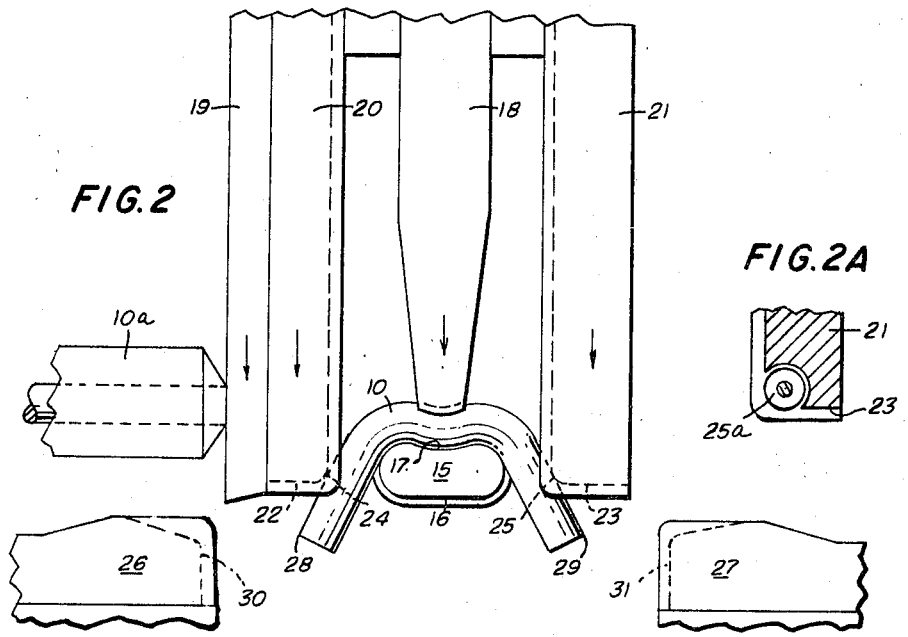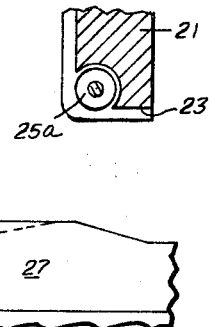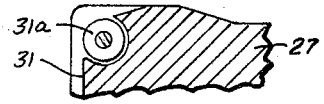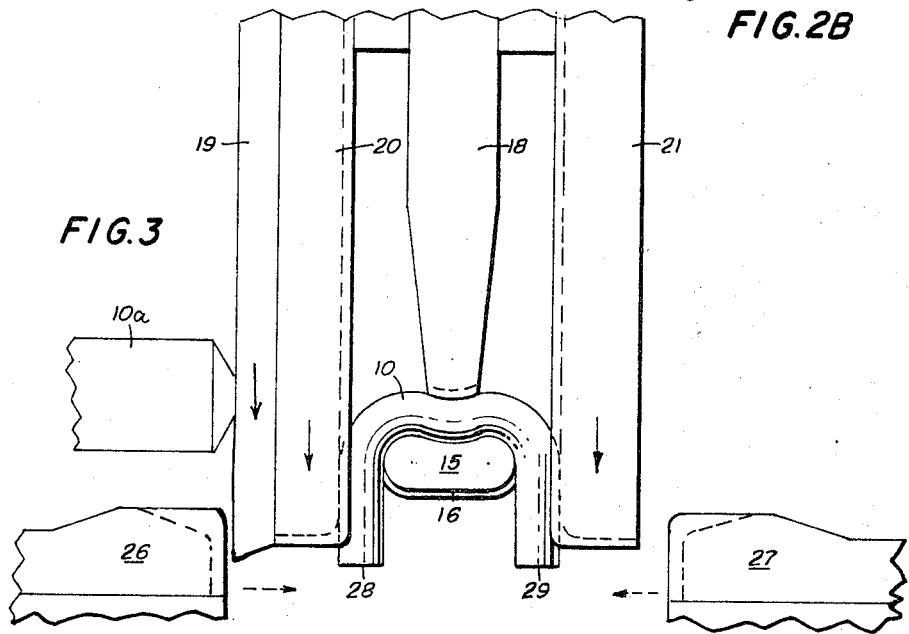

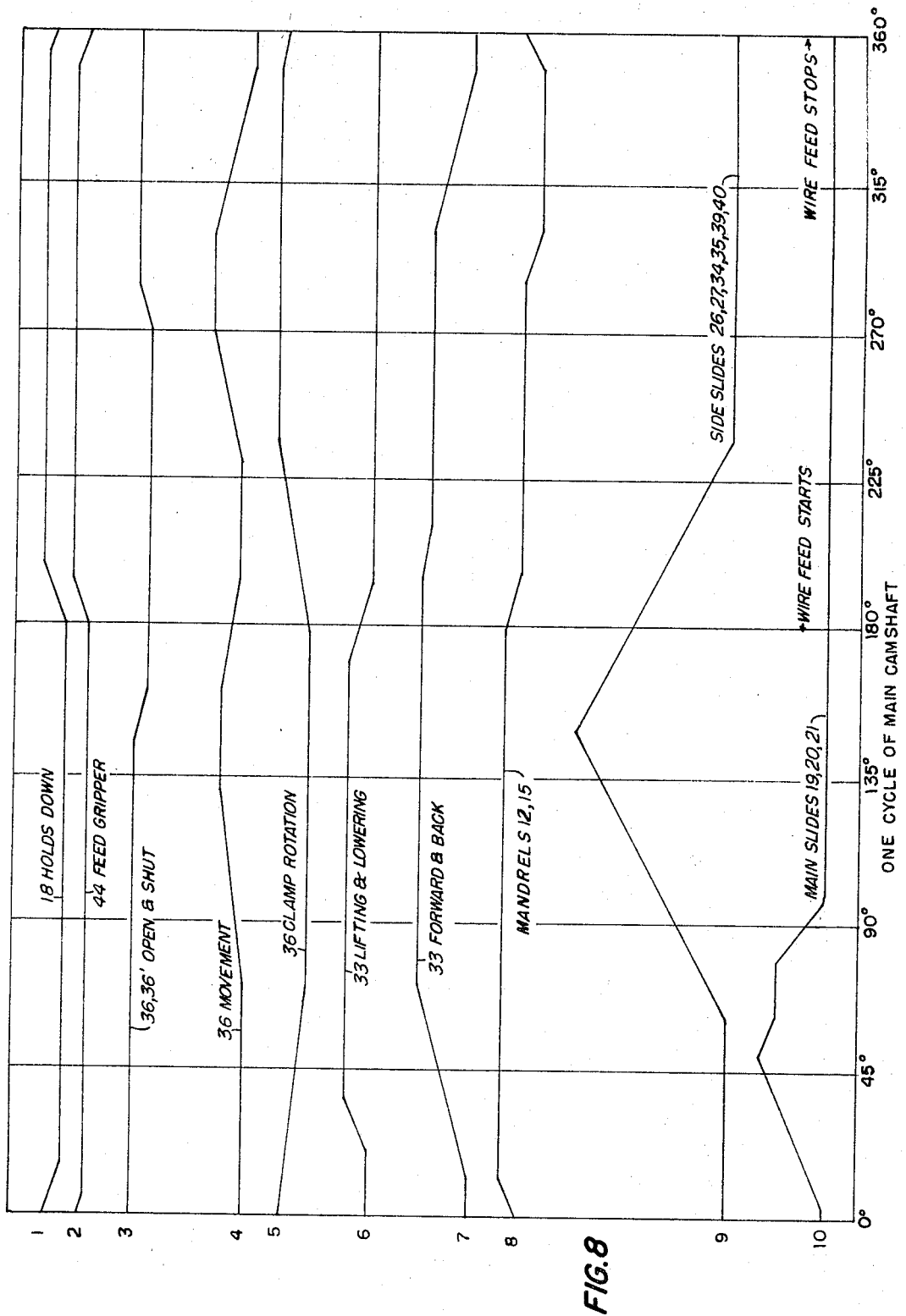

3,431,723
CHAIN MAKING MACHINES
Wilhelm Wattler, Gottesweg 10, Cologne-
Zollstock, Germany
Continuation-in-part of application Ser. No. 101,573,
Apr. 7, 1961. This application July 17, 1964, Ser.
No. 383,483
Claims priority, application Germany, Apr. 14, 1960,
M 45,008
U.S. Cl. 59—25                                    6 Claims
Int. Cl. B21l 1/04

ABSTRACT OF THE DISCLOSURE

A chain making machine wherein a cut piece of wire is bent downwardly about a grooved mandrel by means of grooved bending irons, while the bight of the wire is held in a concavity in the grooved mandrel by a clamping member. The bending irons move to a position beyond the grooved mandrel to bring the ends of the wire into parallelism, then withdraw. Side irons then move inwardly to bend the ends of the wires toward each other. Both the bending irons and the side irons are provided with grooves at the ends and sides adjacent the grooved mandrel. The grooves of each of the bending irons and side irons merge on an arch or smooth curve, and provide a space in excess of the diameter of the wire so that no stress other than bending stresses can be applied to the wire. Means is provided to move the link to an assembly mandrel where the link is closed by grooved die means onto a previously formed link.

---

This invention relates to chain making machines, and is a continuation-in-part of my application Ser. No. 101,573 filed Apr. 7, 1961, now abandoned.

The present invention is an improvement of machines of the known kind where a continuous length of wire is fed intermittently into the machine and, by operation of the machine, a length of wire sufficient for each link is successively cut off and formed around mandrels at two work stations and each link is assembled with the last-formed link to form a chain having closed but unwelded links which will later be welded in a separate machine.

It is an object of the present machine to form links more rapidly, to assemble successive links with the next preceding link more rapidly, and to give each link its proper shape without overstressing the material of said link in the forming thereof and to avoid unnecessary loss of link material in welding due to the need for upsetting or reforming the link at the time of welding.

Other and further objects and advantages of the invention will appear from the following specification taken with the accompanying drawings in which like characters of reference refer to similar parts in the several views, and in which:

FIGURES 2 and 3 are views similar to FIGURE 1 showing only the tools that are used in the forming of the open link.

FIGURE 8 is a chart showing the movements of the several tools and operating elements of the machine through an entire cycle of operation.

Figure 6:
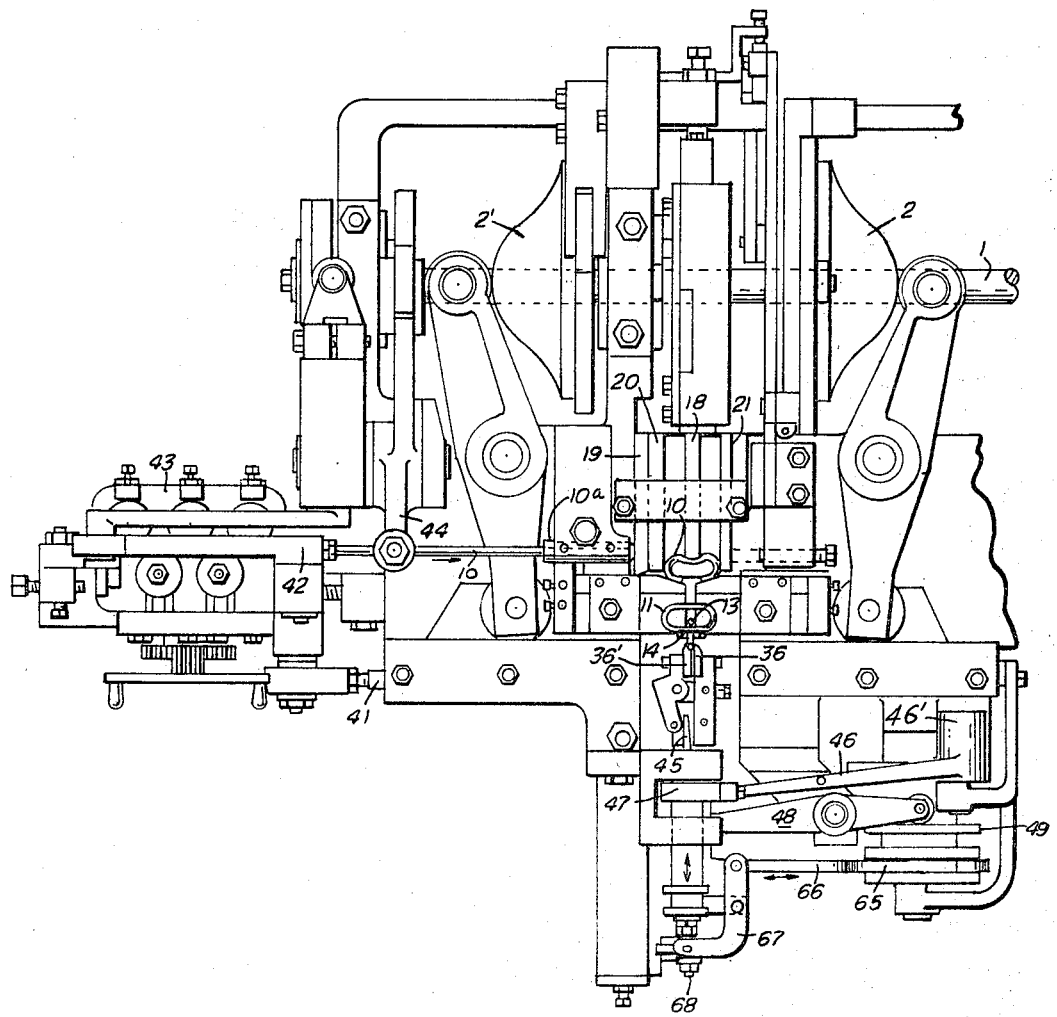
FIGURE 6 is a plan view of the machine with some elements removed for purposes of clarity, showing the feed mechanism and the mechanisms by which the tools are manipulated.

Referring first to FIG. 6, at the right is seen a drive shaft 1 to supply power to the machine. On this shaft are mounted cams 2 and 2' by which reciprocating elements 26, 27, 34, 35 that will be described later, are actuated. Between the cams 2 and 2' are other cams which actuate slide elements and other moving parts of the machine. These cams may be similar to the cams shown in the patent to Berg No. 1,244,448 of Oct. 23, 1917, at 21, 22 and 23, or may be of the types shown in the patent to Berg No. 1,438,474 dated Dec. 12, 1922, at 12, 13 and 14. The specific cams or mechanical movements which are used to activate the several elements of the machine are not of primary importance, and it is considered that any mechanical movements known prior to this application by persons skilled in machine design form a part of this disclosure and may be incorporated herein by reference to public records dated prior to Apr. 14, 1960.

It is important, however, that the motions of the several elements be in proper timed relationship to each other and many means to accomplish such motions will be found in Class 74 of the Classified Patents in the United States Patent Office.

Figure 1:
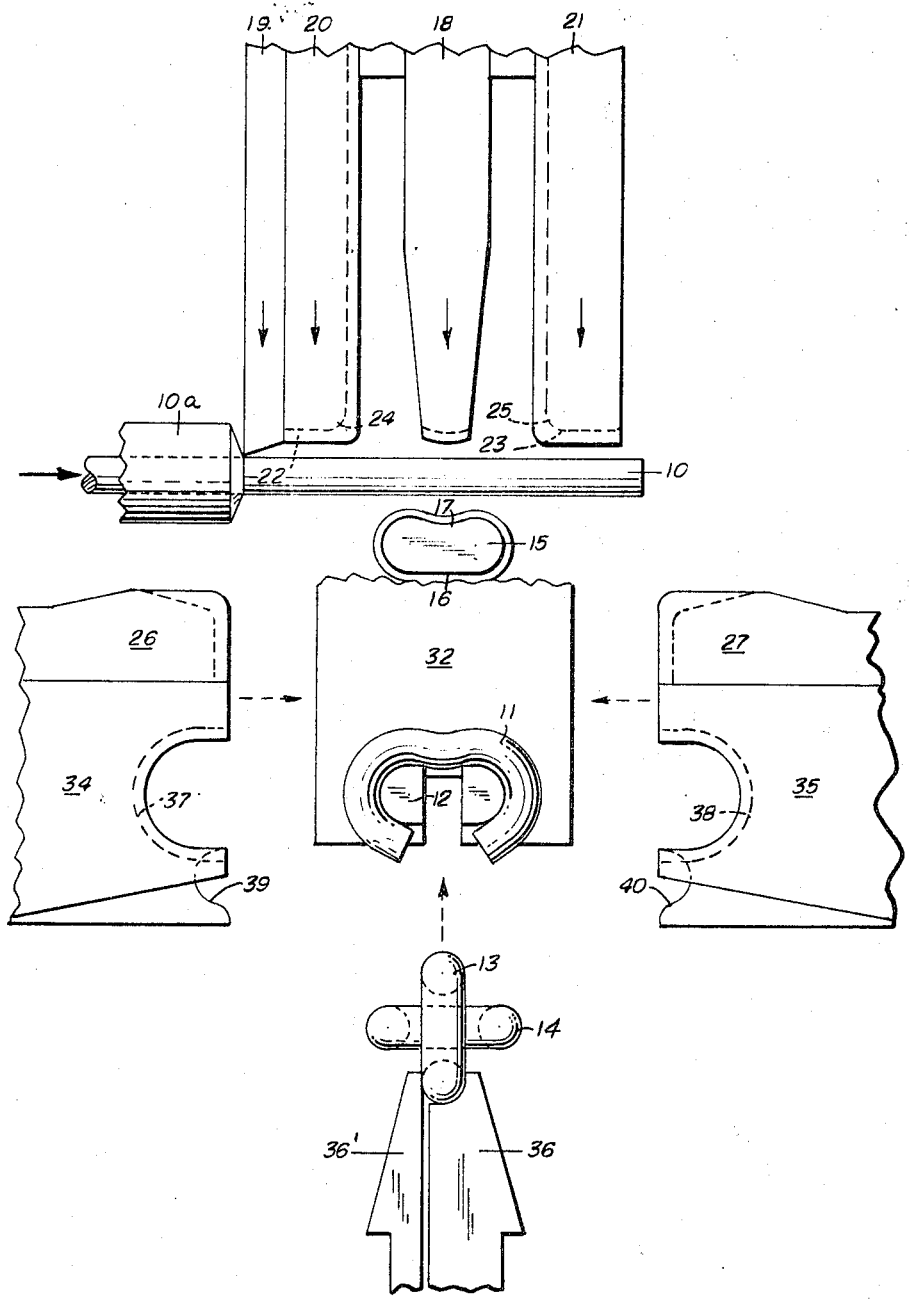
FIGURE 1 is a fragmentary plan view showing only the elements of the machine that operate to form the chain.

Referring now to FIGs. 1, 2, 3, 4 and 5, the portions of the machine that actually operate on the wire to form the links and to assemble them in sequence to form a chain are seen. FIG. 1 shows a start of a cycle (0° in FIG. 8) where a length of a wire 10 has extended through a stationary shear element 10a into a position to be cut off, ready for the first step of forming an open link. A previously formed open link 11 is shown on the secondary mandrel 12 where it is held while a closed link 13, which has previously been assembled with a link 14, is thrust between the open ends of the link 11.

FIGS. 2 and 3 deal only with the formation of the open link in the first instance around primary mandrel 15 which is a two-part mandrel having a groove thereabout into which the wire 10 is bent, each part of the mandrel terminating in a face-to-face contact with the other on an area bounded by line 16 at the bottom of the groove. There is a concavity 17 in the primary mandrel on the side away from the secondary mandrel 12 which provides a function to be described below.

Starting from the position seen in FIG. 1, the detent 18 and knife 19 move towards the wire 10 along with the main bending elements 20 and 21. The knife 19 cuts the wire that extends through the element 10a to provide the proper length of wire to form a link. Detent 18 presses the center of the wire 10 into the depression 17 and the main bending elements 20 and 21 descend to bend the wire 10 into a U shape.

The knife 19 and the bending elements 20 and 21 may be operated by simple cranks or eccentrics arranged with respect to cams 2, 2' so that they are retracted when the elements 26, 27 advance. Detent 18 is operated by a cam within housing 18', provided in a well known manner with a "dwell" at its position seen in FIGURE 4, to hold the link securely against mandrel 15 as the ends are bent inwardly by bending elements 26 and 27.

As seen in FIG. 2 where the wire 10 is partially bent into the U shape, it will be noted that the bending elements 20 and 21 are provided with end and side grooves 22 and 23 which join each other at an arc 24 and 25, so that at no time is the wire 10 contacted by a sharp corner of a bending means.

Attention is invited to FIG. 2a in which a slight modification of the bending iron 21 is illustrated using a grooved roller 25a to form the arc between the end and side grooves. A similar bending iron with a roller would be used at 20. While the radii of arcs 24 and 25 are not critical, they should be of such a radius that there will be no penetration of the bending iron into the metal of the wire as it is bent.

The bending means or bending irons 20 and 21, it will be noted, are spaced a distance from the mandrel 15 such that the wire 10 between the groove in the mandrel and the groove in the side face of the bending irons will have a play of 1/10 of the diameter of the wire. The provision of this play is an important feature of the present invention, and has not been provided in any known chain-making machines. With this play the wire can be bent easily and does not suffer any damage, the bending operation requiring only 60% of the power required if this play is not provided. It will be seen, therefore, that the strain on the bending irons is considerably reduced, their working life is considerably increased, it is also possible to use lighter machinery, and the operation of the machine is much more quiet.

From the position shown in FIG. 2, the bending irons 20 and 21 descend to complete the U-bending of the wire 10, as seen in FIG. 3.

It has been the custom in earlier chain-bending machines to provide inwardly moving bending elements similar to elements 26 and 27, that operate on the wire when bent into a condition similar to that shown in FIG. 2. The result has been that such bending elements contact the wire at the edges 28 and 29 so that an end thrust is placed on the wire 10, the corners 28 and 29 are deformed, and a very heavy pressure is required to form the wire 10 about a mandrel. The reason for this construction of the earlier machines was that it was not believed possible to have the bending irons 20 and 21 descend into the path of the bending irons 26 and 27.

In the present device, however, the bending irons 20 and 21 do descend into the path of bending irons 26 and 27 so that the wire 10 is bent into the configuration shown in FIG. 3. While the knife 19 may descend as far as bending irons 20 and 21, it is not necessary that it do so.

Figure 4:
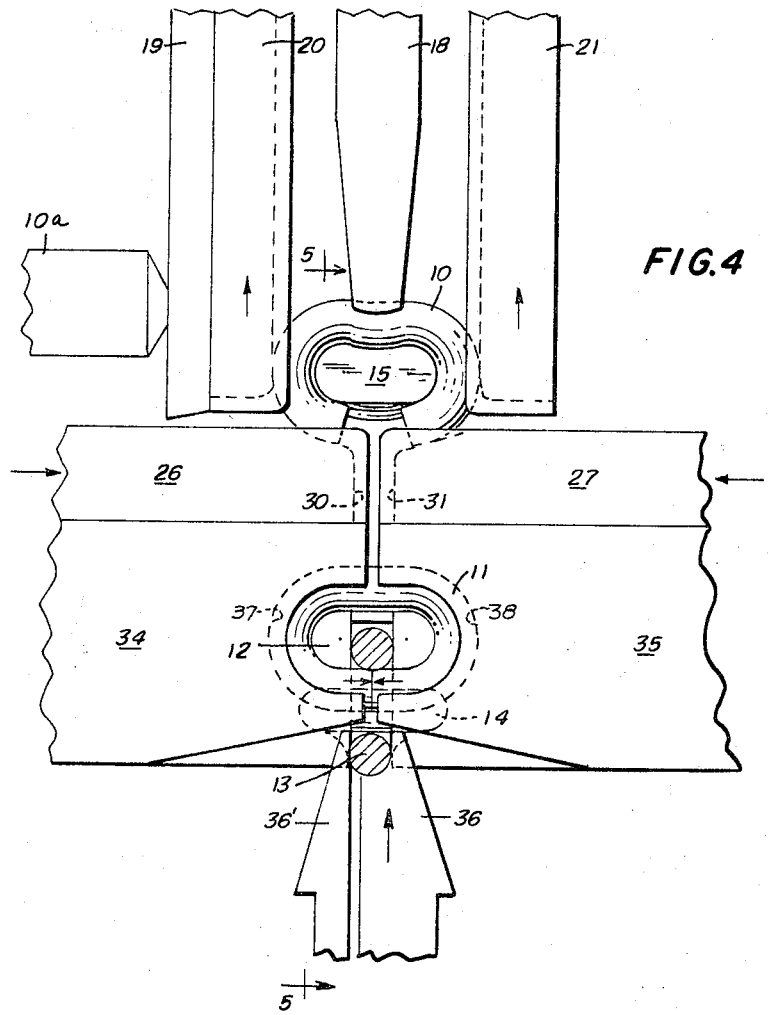
FIGURE 4 is a view similar to FIGURE 1 in which the tools are shown in the position of forming an open link, closing an open link, and sizing a closed link.

As seen in FIG. 4, the bending elements 20 and 21 retract partially, but while still in contact with the wire 10 to hold the wire 10 in position on mandrel 15, the side bending elements 26 and 27 move inwardly. These bending elements 26, 27 are provided with end and top grooves 30 and 31, respectively, which engage the ends of the wire 10 first flatwise in the lower part of the grooves 30 and 31, and then tangentially to the curvature of the formed link at the upper part of the grooves 30, 31. Bending irons 26, 27 may be formed with a grooved roller providing the arcuate surface merging the two parts of grooves 30, 31, as shown in FIG. 2B.

Upon completion of the inward bending of the ends of wire 10, as seen in FIG. 4, the bending irons 26 and 27 and bending irons 20 and 21 retract to their original position, detent 18 is withdrawn leaving an open link formed about the main mandrel 15, the opening of the link being slightly greater than the diameter of the wire 10.

Figure 5:
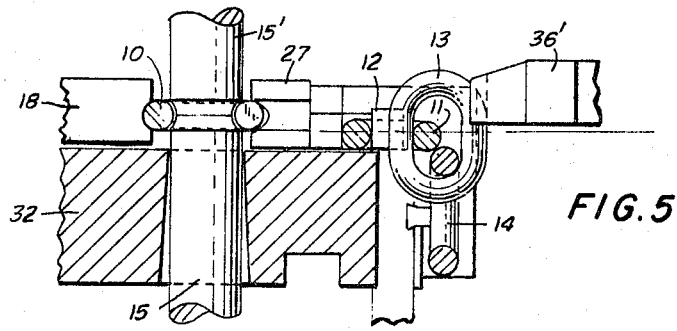
FIGURE 5 is a fragmentary section on line 5—5 of FIGURE 4.
Figure 7:
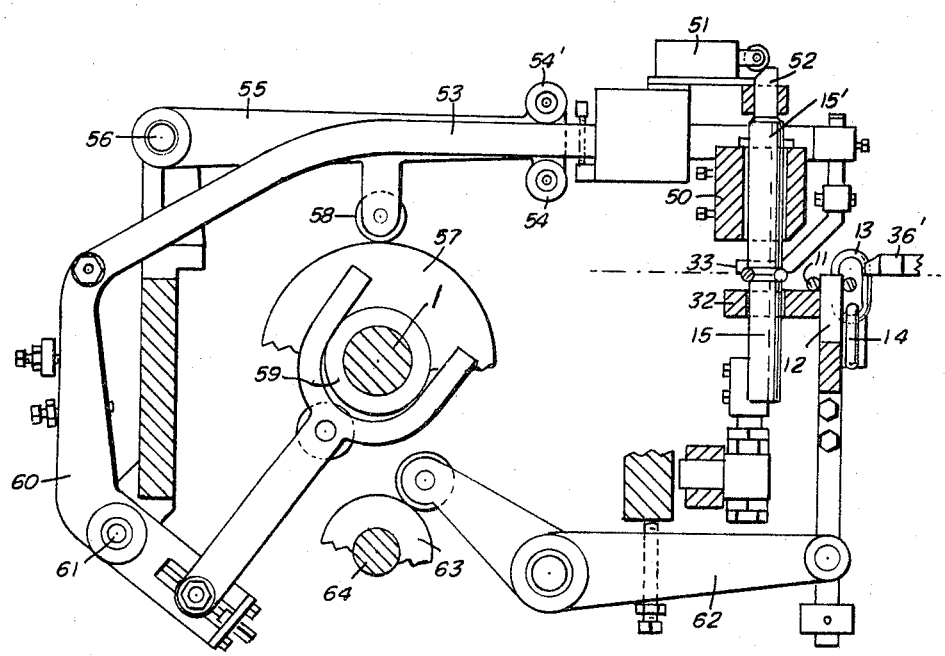
FIGURE 7 is a diagrammatic elevation showing the mechanism by which certain of the tools are operated.

The main mandrel 15 made up of its two elements 15 and 15', as seen in FIGS. 5 and 7, then opens and the open link is deposited on the surface of the work table 32. A transporter element 33, as seen in FIG. 7, then descends and moves forward toward the secondary mandrel 12 which, at this time, is retracted below the surface of the table 32, so that the transporter element 33 may properly position the open link seen at 11 in FIG. 1. Secondary mandrel 12 then is moved up into the open link 11 to hold it in position.

The transporter element 33 then returns to its original position, the primary mandrel 15, 15' closes, and the knife 19, bending elements 20, 21 may then recommence their operation in forming a second open link.

Forming die elements 34 and 35 move in unison with bending elements 26 and 27, and are shown in open position in FIG. 1. During the time that these forming die elements are in their open position a previously closed link 13 is thrust between the open ends of open link 11 by tongs 36, 36' and held there while the forming dies 37 and 38 move inwardly with the bending elements 26 and 27. Forming die shapes 37, 38 formed in elements 34, 35 close the link and tend to straighten the concave side opposite the link opening, as seen in FIG. 4. By providing the concavity in the open link on the side of the link opposite the opening in link 11, the force necessary to close the link is substantially reduced, and a straight sided link is formed instead of a link with a side that bulges opposite to the link opening.

It will be noted that the link 13 which is supported by the tongs 36 is not operated on by any die. A link 14, however, which was formed immediately prior to the link 13 is operated on by additional forming die shapes 39 and 40 which move inwardly and outwardly with the forming die elements 34 and 35 (and bending irons 26, 27). It is seen, then, that there are three work stations at which each link is operated on. First, an open link 10 is formed about the main mandrel 15, second, the open link 11 is closed about the secondary mandrel 12 and a previously closed link 13, and third, a closed link 14 is given a final form by dies 39 and 40.

In the older machines it was found that the ends of the wire as an open link is closed contact only at the interior periphery of the closed link. This resulted in the use of more material because, in the welding operation which is done in a separate machine, the weld would need to be made progressively from the inner to the outer side, the inner side being upset until the outer edges meet, requiring more metal to be melted before the link at the outside periphery would be fused together.

In the present case, however, due to the formation of the links as described above, the square cut link ends contact in much more nearly face-to-face contact, causing much less waste in the process of welding, less distortion takes place at the welding, and less flash is formed.

With respect to feeding of the wire 10 to the machine, attention is invited to the left-hand side of FIG. 6 where a connecting rod 41 operates to reciprocate a movable clamp 42 which is mounted on a five-wheel straightening device 43. A fixed clamp device 44 permits the wire to be moved to the right but not to the left, so that at each reciprocation of the connecting rod 41 a length of wire is straightened and fed towards the machine. The throw of the connecting rod 41 may be adjusted as required, by use of an adjustable eccentric at the far end, which is not shown, as it is a conventional structure.

Upon retraction of the forming elements 34 and 35, as seen in FIG. 4, the tongs, 36, 36' must grasp the newly completed link 11 in order to position it in the machine as shown for link 13 in FIGS. 1, 4, and 5. Secondary mandrel 12, remains for this reason in its elevated position while the tongs 36, 36' release the link 13, withdraws slightly, and rotates a quarter turn to the right, as seen in FIG. 4, away from the observer, as seen in FIG. 5. Tongs 36, 36' then are advanced to a position where it graps the right-hand end of link 11, as seen in FIG. 4, is retracted, is turned a quarter of a turn to the position seen in FIG. 1, then is thrust forwardly into the position seen in FIG. 4 for the link 13. This sequence of events for the tongs 36, 36' is of course governed by a mechanism timed with relationship to the operation of the other elements of the machine, and may be performed by any of many mechanical movements. The mechanical movements shown, however, include a wedge 45 which, as seen in FIG. 6, opens and closes the tongs 36 and 36' by being thrust forwardly towards the link to close the tongs and retracted away from the link to open the tongs by means of cam 65, slide bar 66 and bell crank 67 operating on a rod 68. The quarter turn is accomplished by swinging of an arm 46 on a pivot 46' which may have a sector of gear on its end meshing with a gear 47 on the shaft of the tongs 36, 36'. The motion of the tongs 36, 36' towards and away from the link is accomplished by the lever 48 running on a cam 49 which is provided with appropriate configurations to move the end of lever 48 back and forth so that tongs 36 will be removed as described. It will be noted in FIG. 7 that the plane of the bottom of tongs 36, 36' lies slightly above the plane of the top of link 11 when it is in the link-holding position. The axis of rotation, however, of tongs 36, 36' is in the plane of the center of link 11, so that it will be seen that tongs 36, 36' never interfere with the movement of the link 13 nor does the link 13 interfere with the movement of the tongs 36, 36'.

The specific mechanical elements which are used to reciprocate and rotate the tongs 36, 36' are not shown in detail in this disclosure since, under the patent classification, a separate classification under Class 74 is found for such mechanical elements or movements, many of which may be used to effect the desired movements of the elements of the present device, and the specific selection of such mechanical elements does not form a part of the present invention.

Referring to FIG. 7, it will be noted that the upper part 15' of the main mandrel is clamped in a portion of the machine frame 50 and, as shown in FIG. 7, there is a switch 51 provided at the top of the machine. Mandrel portion 15' is provided with an extension 52 which, upon over-stressing of the machine (for instance, by something coming between the two parts of the main mandrel as the mandrel portion 15 moves upwardly), will activate switch 51 to stop operation of the machine.

The transporting element 33 is shown as being mounted on the end of a lever arm 53 which is supported by rollers 54, 54' mounted in arm 55, pivoted at 56 to the frame of the machine. Lever 55 is moved upwardly or downwardly as required, in timed relationship to the other actuating means by a cam 57, which may be mounted on shaft 1, operating on a wheel 58. Lever 53 is moved lengthwise of itself to move the transporting means 33 forwardly and rearwardly by means of a cam 59 operating through a lever 60 which is pivoted to the machine frame at 61. Other suitable mechanisms could of course replace the levers and links shown in FIG. 7 without departing from the scope of the present invention. The secondary mandrel 12 may be very simply operated by means of a lever 62 operated by a cam 63 mounted on an ancillary shaft 64 of the machine. A similar lever and cam is used to operate the main mandrel portion 15.

FIG. 8 shows diagrammatically the motion of the various elements of the machine throughout a single cycle of operation. It will be noted that the zero degree station at the lefthand end of FIG. 8 is located immediately after feeding of the wire 10 to the machine. It will further be noted that the hold-down 18 (see top line of FIG. 8) descends on the wire 10 and holds it down throughout the first 180° of operation. The operation of the tongs 36, 36' is shown in the third, fourth and fifth lines, the third line showing the times of open and shut for the tongs, the fourth line showing the movement of the tongs forward and back, and the fifth line showing the rotation in its quadrant of rotation. The operation of the transporting element 33 is noted in the sixth and seventh lines, the sixth line showing the lifting and lowering of the element 33 and the seventh line being the forward and backward movement of the element 33. Mandrels 12 and 15 operate simultaneously as shown in the single eighth line having a simple up and down movement. It is noted that the slides 19, 20, 21 which are the bottom-most or tenth line of the graph start to return to their original positions before the side slides 26, 27 commence their inward motion shown in the ninth line, and the side slides have started their outward motion before the wire feed starts at the 180° point of cycle.

It will be seen, therefore, that a new combination of elements has been provided which greatly facilitates and accelerates the formation of chain links assembled in the form of an unwelded chain.

What is claimed is:

1. In a chain making machine, a wire feed means to supply wire intermittently to the machine, wire cutoff means to sever a length of wire, a bending mandrel having a concavity on one side, a horizontally movable clamping member to press the midpoint of the cut length of wire against and into the concavity in said bending mandrel, bending irons having ends movable in a horizontal plane parallel to said clamping member, said bending irons being grooved on their ends merging on an arc with grooves on their sides toward said clamping member to guide the wire during bending, the grooves on the sides of said bending irons providing a play in the plane of bending of one tenth the diameter of the wire so that only bending stresses are applied to the wire, said bending irons being adapted to move to a position beyond the said bending mandrel to bend the extreme ends of the wire into substantial parallelism extending beyond said bending mandrel, side irons having facing ends in a plane parallel to said bending irons and movable at right angles to the motion of said bending irons, said side irons being separated from each other in one position a distance such that said bending irons may extend between them during advance of said bending irons, and means to move said side irons toward each other upon withdrawal of said bending irons, said side irons being provided with grooves on their ends and sides, the groove means on their facing ends merging on an arc with the groove means on the sides thereof toward said bending mandrel, said side irons being movable to substantially meet each other adjacent said bending mandrel whereby said wire is bent into the form of an open link, the mandrel, the bending irons and the side irons being proportioned to leave the opening in the open link slightly wider than the diameter of the wire.

2. In a chain making machine, a wire feed means to supply wire intermittently to the machine, wire cutoff means to sever a length of wire, a bending mandrel, a horizontally movable clamping member to press the midpoint of the cut length of wire against said bending mandrel, bending irons having ends movable in a horizontal plane parallel to said clamping member, said bending irons being grooved on their ends and on their sides toward said clamping member to guide the wire during bending, the grooves on the sides of said bending irons merging in an arc with the grooves on the ends thereof, and providing a clearance such that as the wire is being bent by said bending irons a play of one tenth the diameter of the wire will be provided to assure that only bending stress be applied to the wire, said bending irons being adapted to move to a position beyond the said bending mandrel to bend the ends of the wire into substantial parallelism extending beyond said bending mandrel, side irons having facing ends in a plane parallel to said bending irons and movable at right angles to the motion of said bending irons, said side irons being separated from each other in one position a distance such that said bending irons may extend between them during advance of said bending irons, and means to move said side irons toward each other upon withdrawal of said bending irons, said side irons being provided with groove means on their facing ends and on the sides thereof, said groove means merging on an arc between said groove means on their facing ends and on the sides of said side irons toward said bending mandrel, said side irons being moved to substantially meet each other adjacent said bending mandrel whereby said wire is bent into the form of an open link, the mandrel, the bending irons and the side irons being proportioned to leave the opening in the open link slightly wider than the diameter of the wire, an assembling mandrel spaced from said bending mandrel in the horizontal direction opposite to said clamping member, said assembling mandrel being bifurcated to receive a previously formed link, means to move said open link after being formed about said bending mandrel to said assembling mandrel to be positioned and held thereby, means to position a previously formed link in the path of said open link when it is moved to locate it at said assembling mandrel so one side of said previously formed link will be received within the opening in said open link, and grooved die means movable with said side irons as they advance to bend the wire of the open link to complete its formation into a succeeding link about said bending mandrel, said die means being so shaped as to close the opening in said open link.

3. The bending machine of claim 2, in which said bending mandrel is provided with a concavity on its side toward said clamping member, whereby the side of said open link opposite the opening is concave.

4. In a chain making machine, a wire feed means to supply wire intermittently to the machine, wire cutoff means to sever a length of wire, a bending mandrel, a horizontally movable clamping member to press the midpoint of the cut length of wire against said bending mandrel, bending irons having ends movable in a horizontal plane parallel to said clamping member, said bending irons being grooved on their ends and on their sides toward said clamping member to guide the wire during bending, said bending irons being adapted to move to a position beyond the said bending mandrel to bend the ends of the wire into substantial parallelism extending beyond said bending mandrel, the grooves on the ends of said bending irons merging in a smooth curve with the grooves on the facing sides thereof, the depth of the grooves in the sides of said bending irons providing for a play of ten percent of the diameter of the wire, side irons having facing ends in a plane parallel to said bending irons and movable at right angles to the motion of said bending irons, said side irons being separated from each other in one position a distance such that said bending irons may extend between them during advance of said bending irons, means to move said side irons toward each other upon withdrawal of said bending irons, said side irons being provided with groove means on their facing ends and on the sides thereof toward said bending mandrel and movable to substantially meet each other adjacent said bending mandrel whereby said wire is bent into the form of an open link, the grooves in the facing ends merging on a smooth curve into the grooves on the sides of said side irons, the mandrel, the bending irons and the side irons being proportioned to leave the opening in the open link slightly wider than the diameter of the wire, means to assemble said open link with a closed link, means to close an open link when so assembled, and means to position said open link after closing within the next successively formed open link.

5. In a chain making machine, a mandrel, a detent, means to insert a length of wire to make a single link between the mandrel and the detent, means to move said detent toward said mandrel to securely clamp the length of wire between the mandrel and detent, bending irons having end and side faces adapted to move parallel to the movement of said detent, grooves in the end and side faces of said bending irons, said grooves in each bending iron merging with each other on an arc, the spacing of said bending irons from said mandrel being such as to provide a play within the groove between the bending irons and the mandrel of $1/10$ of the diameter of the wire being bent.

6. The chain making machine of claim 5 having two bending elements having opposed grooved end faces, said bending elements being movable at right angles to said bending irons and engageable with the ends of the wire after it has been bent into parallel sided U shape, a groove in the face of each said bending element on its side toward said mandrel merging on an arc with the groove in the corresponding end face, and means to reciprocate said bending irons and said bending elements in timed relationship with each other so that said bending irons extend between said bending elements to bend the sides of the wire into the U shape and so that the bending elements move toward each other only after the bending irons are partly withdrawn to bend the sides of the U inwardly to form an open chain link.

References Cited

UNITED STATES PATENTS

| | | | |
|---|---|---|---|
| 1,244,448 | 10/1917 | Berg | 59—23 |
| 1,340,639 | 5/1920 | Weinacker | 59—25 |
| 1,360,021 | 11/1920 | Rehfuss | 59—27 |
| 1,405,379 | 1/1922 | Rehfuss | 59—27 |
| 1,438,474 | 12/1922 | Berg | 59—23 |

FOREIGN PATENTS

| | | |
|---|---|---|
| 654,664 | 11/1928 | France. |
| 628,747 | 6/1947 | France. |
| 319,664 | 4/1957 | Switzerland. |

CHARLES W. LANHAM, *Primary Examiner.*

G. P. CROSBY, *Assistant Examiner.*

U.S. Cl. X.R.

59—27